United States Patent
Saitoh et al.

[11] Patent Number: 6,137,447
[45] Date of Patent: *Oct. 24, 2000

[54] ANTENNA FOR READER/WRITER

[75] Inventors: Shoshichi Saitoh; Masahiro Fujimoto; Katsuhisa Orihara; Susumu Yanagibori, all of Kanuma, Japan

[73] Assignee: Sony Chemicals Corporation, Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/721,949

[22] Filed: Sep. 27, 1996

[30] Foreign Application Priority Data

Sep. 30, 1995 [JP] Japan ................................ 7-276978

[51] Int. Cl.$^7$ ...................................... H01Q 21/28
[52] U.S. Cl. ......................... 343/742; 343/867; 343/842; 235/492
[58] Field of Search ..................... 343/748, 742, 343/867, 842; 340/572; 235/492; H01Q 7/02, 7/04, 7/06, 7/08, 11/12, 21/28

[56] References Cited

U.S. PATENT DOCUMENTS

| | | | |
|---|---|---|---|
| 4,922,261 | 5/1990 | O'Farrell | 343/867 |
| 5,047,715 | 9/1991 | Morgenstern | 343/742 |
| 5,274,332 | 12/1993 | Matsubara | 235/492 |
| 5,448,110 | 9/1995 | Tuttle et al. | 257/723 |
| 5,602,556 | 2/1997 | Bowers | 343/742 |
| 5,821,525 | 10/1998 | Takebayashi | 343/895 |

FOREIGN PATENT DOCUMENTS

| | | |
|---|---|---|
| 0 079 047 A2 | 5/1983 | European Pat. Off. . |
| 37 21 822 C1 | 11/1988 | Germany . |

*Primary Examiner*—Michael C. Wimer
*Attorney, Agent, or Firm*—Hill & Simpson

[57] ABSTRACT

In an antenna $1a$ for reader/writer of an interrogator in a non-contact data carrier system comprising the interrogator and a transponder, the antenna for reader/writer of the interrogator comprises a transmitting antenna 2 for transmitting a signal to the transponder and a receiving antenna 3 for receiving a signal from the transponder, and the receiving antenna 3 is a loop coil located at a position where magnetic fields of opposite polarities are induced in the receiving antenna 3 by magnetic coupling between the receiving antenna 3 and the transmitting antenna 2 and where the magnetic fields of opposite polarities cancel out each other. Preferably, the transmitting antenna 2 is comprised of at least two loop coils $2a$, $2b$ for generating magnetic fields of opposite polarities to each other.

4 Claims, 8 Drawing Sheets

1a

1b

1c

1e

1f

1g

1h (x-x section)

ANTENNA FOR READER/WRITER

BACKGROUND OF THE INVENTION

1. Field of the Invention

The present invention relates to a loop antenna used in an interrogator of a non-contact data carrier system for performing short-distance communication by electromagnetic induction between the interrogator and a transponder. More particularly, the present invention concerns a loop antenna used to send a transmission signal from the interrogator to the transponder and to receive a reply signal from the transponder in the interrogator, which can detect the reply signal from the transponder without detecting the transmission signal emitted from the interrogator, thereby facilitating detection of the reply signal and enhancing reliability of reading.

2. Related Art of the Invention

Receiving attention and quickly spreading these years are non-contact data carrier systems for performing short-distance communication by electromagnetic induction coupling between the interrogator and the transponder. For example, the automatic ticketing system, the access control system, or the like adopts a non-contact information card system using a reader/writer as an interrogator and a card, such as an IC card or an ID card, as a transponder.

In this non-contact data carrier system, in order to send information to the transponder or further to supply power thereto, the interrogator sends electromagnetic waves at frequencies of approximately several hundreds of kHz to several MHz to the transponder and, at the same time, receives the reply signal from the transponder to detect it. In this case, the interrogator is normally provided with a loop antenna as a dual-purpose antenna serving both as a transmitting antenna for sending the signal or the power to the transponder and as a receiving antenna for receiving the reply signal from the transponder.

In the conventional non-contact data carrier systems, however, when the interrogator receives and detects the reply signal from the transponder, at the loop antenna terminals of the interrogator there appear not only the reply signal from the transponder, but also the transmission signal having been sent to the transponder by the interrogator per se. In this case, the longer the communication range (i.e., the distance between the interrogator and the transponder), the higher the intensity of the transmission signal sent from the interrogator to the transponder. Therefore, the ratio of the transmission signal to the reply signal appearing at the loop antenna terminals of the interrogator increases as the communication range becomes longer. Normally, the transmission signal appearing at the loop antenna terminals of the interrogator is about 100 to 100,000 times stronger than the reply signal to be detected. This resulted in a weak reply signal appearing in undesired signals harmful and severe to reception of signal, at the loop antenna terminals of the interrogator. In addition, reception intensities of transmission signals undesirably received upon receiving the reply signal from the transponder at the loop antenna terminals of the interrogator are not constant because of dispersion upon fabrication of loop antennas for interrogator and dispersion in resonance capacitance. Further, since the inductance, capacitance, Q value, and the like of the loop antenna change with a change of temperature, the level of undesired waves also varies every hour at the loop antenna terminals in receiving the reply signal from the transponder. Thus, there was the problem that it was very difficult to receive and accurately detect the reply signal from the transponder by the loop antenna of interrogator and thus not easy to secure the reading reliability of data. This in turn raised the problem that the circuitry for reading the reply signal became complex and expensive.

These problems were commonly observed in the conventional cases, not only in applications where the interrogator was provided with a loop antenna as a dual-purpose antenna serving both as a transmitting antenna and as a receiving antenna, but also in applications where the interrogator was provided with separate transmitting antenna and receiving antenna. Namely, when the interrogator has the transmitting antenna and the receiving antenna simply separated from each other, coupling occurs between the transmitting antenna and the receiving antenna, whereby the transmission signal from the transmitting antenna is induced directly in the receiving antenna, resulting in undesired transmission signals appearing at high level at the receiving antenna terminals.

SUMMARY OF THE INVENTION

The present invention has been accomplished to solve the above problems in the conventional technology, and an object of the present invention is to prevent the transmission signal transmitted from the interrogator to the transponder from appearing at the antenna terminals of the interrogator in receiving the reply signal from the transponder through the antenna of interrogator in the non-contact data carrier system for performing the short-distance communication by electromagnetic induction between the interrogator and the transponder, thereby facilitating detection of the reply signal from the transponder and thus enhancing the reading reliability.

For achieving the above object, the present invention provides an antenna for reader/writer of an interrogator in a non-contact data carrier system comprised of the interrogator and a transponder, the antenna for reader/writer of the interrogator comprising a transmitting antenna for transmitting a signal to the transponder and a receiving antenna for receiving a signal from the transponder, wherein the receiving antenna comprises a loop coil located at a position where magnetic fields of opposite polarities to each other are induced in the receiving antenna by magnetic coupling between the receiving antenna and the transmitting antenna and the magnetic fields of opposite polarities cancel out each other.

Particularly, the invention provides the antenna for reader/writer as stated above, wherein the transmitting antenna comprises at least two loop coils for generating respective magnetic fields of opposite polarities to each other, wherein the receiving antenna is located so that magnetic fields induced in the receiving antenna by the magnetic fields of mutually opposite polarities generated from these loop coils cancel out each other and in this case, a loop diameter of each loop coil of the transmitting antenna, the number of turn thereof, a direction of turn thereof, an absolute value of an electric current flowing through each loop coil, and a phase difference between electric currents flowing in the respective loop coils are selected so that magnetic field intensities of the magnetic fields from the transmitting antenna decrease more greatly outside a communication zone than inside the communication zone, or at least one of these parameters is adjusted finer.

DETAILED DESCRIPTION OF THE INVENTION

Figure 1:
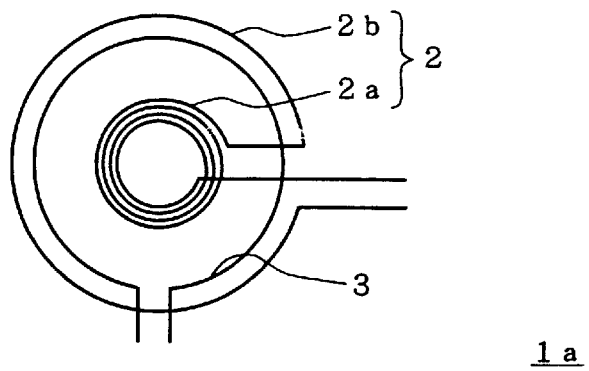
FIG. 1 is a structural drawing to show an embodiment of the antenna for reader/writer according to the present invention.

The antenna for reader/writer (reader/writer antenna) according to the present invention is composed of a transmitting antenna and a receiving antenna separately provided, and the receiving antenna is composed of a loop coil located at a position where magnetic fields of opposite polarities to each other are induced therein by magnetic coupling between the receiving antenna and the transmitting antenna and these magnetic fields of the opposite polarities cancel out each other. Therefore, in an interrogator provided with the reader/writer antenna of the present invention, the transmission signal from the transmitting antenna is canceled out in the receiving antenna even during transmission of the transmission signal for transmitting information or supplying the power to the transponder through the transmitting antenna, thereby preventing the transmission signal from appearing at the receiving antenna terminals. This can facilitate reading of the reply signal from the transponder through the receiving antenna, thus enhancing the reading reliability of data.

Particularly, in the reader/writer antenna of the present invention, the transmitting antenna is comprised of at least two loop coils for generating the magnetic fields of mutually opposite polarities, it is arranged to cancel out the magnetic fields induced in the receiving antenna by the magnetic fields of mutually opposite polarities generated by these loop coils, and further in this case, at least one factor is selected and adjusted out of the loop diameter of each loop coil of the transmitting antenna, the number of turn thereof, the direction of turn thereof, the absolute value of an electric current flowing in each loop coil, and the phase difference between the electric currents flowing in the loop coils so that the magnetic field intensities of the magnetic fields from the transmitting antenna decrease more greatly outside the communication zone than inside the communication zone, whereby it becomes possible to decrease the magnetic field intensity outside the communication zone while maintaining the magnetic field intensity high enough inside the communication zone and securing high communication quality and also to drastically reduce interference or obstruction to neighboring devices or neighboring communication systems.

Embodiments of the present invention will be described in detail with reference to the drawings. In the drawings, the same reference symbols denote the same or equivalent constituent elements.

FIG. 1 is a structural drawing of an embodiment of the reader/writer antenna. This reader/writer antenna 1a is composed of a transmitting antenna 2 and a receiving antenna 3 separately provided. Among them, the transmitting antenna 2 is composed of a multi-circular internal loop coil 2a and a one turn external loop coil 2b, coaxially formed in a same plane. The internal loop coil 2a and external loop coil 2b are made of a line of antenna conductor so as to be wound in mutually opposite directions. Therefore, the internal loop coil 2a and external loop coil 2b generate respective magnetic fields of opposite polarities to each other upon sending the transmission signal.

This transmitting antenna 2 can be obtained, for example, by winding a conductor wire so as to form the internal loop coil and external loop coil as illustrated. As another example, it may be obtained by etching a conductor layer, such as a copper foil, of a substrate with the conductor layer on an insulator layer.

On the other hand, the receiving antenna 3 is comprised of a circular loop coil, the loop diameter of which is larger than that of the internal loop coil 2a of the transmitting antenna but smaller than that of the external loop coil 2b, and is located so as to be nearly coaxial with the internal loop coil 2a and external loop coil 2b. Here, the loop diameter of the receiving antenna 3 and the position thereof relative to the internal loop coil 2a and external loop coil 2b are properly determined so that the mutual inductance between the receiving antenna 3 and the internal loop coil 2a is equal in value but opposite in polarity to the mutual inductance between the receiving antenna 3 and the external loop coil 2b, thus canceling each other. Specifically, for example, the coil parameters of the receiving antenna 3 and the position thereof are determined so that the terminal voltage appearing at the receiving antenna terminals when the transmission signal is sent from the internal loop coil 2a may be equalized to the terminal voltage appearing thereat when the transmission signal is sent from the external loop coil 2b, so as to make the apparent terminal voltage zero at the receiving antenna terminals. If the transmitting antenna 2 and receiving antenna 3 are highly symmetric horizontally or vertically in view of the structure like the reader/writer antenna 1a of FIG. 1 or reader/writer antennas 1b (FIG. 2), 1c (FIG. 3), 1d (FIGS. 4A and 4B), 1e (FIGS. 7A and 7B), 1f (FIG. 9), 1g (FIG. 10), 1h (FIG. 11), and 1i (FIG. 12) as detailed below, it is relatively easy to predict the loop diameter of the receiving antenna 3 and the position thereof relative to the loop coils constituting the transmitting antenna.

The receiving antenna 3 may be formed by winding a conductor wire or by etching a substrate, similarly as the transmitting antenna is formed as described above. In particular, if the transmitting antenna 2 is formed by etching one conductor layer of a double-sided substrate having conductor layers on the both surfaces, the receiving antenna 3 is preferably formed by etching the other conductor layer on the opposite side of the double-sided substrate, in view of simplification of fabrication steps.

When an interrogator is provided with the reader/writer antenna 1a composed of the transmitting antenna 2 and the receiving antenna 3 as described above and even if transmission signals are being sent from the transmitting antenna 2 (the internal loop coil 2a and external loop coil 2b) of the interrogator to the transponder in order to send information or supply the power thereto while the receiving antenna 3 of the interrogator is receiving the reply signal from the transponder, transmission signals of mutually opposite polarities from the transmitting antenna 2 cancel each other in the receiving antenna 3, which drastically reduces the undesired voltage occurring at the terminals of the receiving antenna 3 due to the transmission signals. Accordingly, the reply signal can be detected easily and with high reading reliability at the receiving antenna 3.

In generating the magnetic fields of mutually opposite polarities from the internal loop coil 2a and external loop coil 2b constituting the transmitting antenna in this manner, it is preferable to adjust the loop coils so that the magnetic field intensity of the total field as a composition of the magnetic fields generated from the internal loop coil 2a and external loop coil 2b may decrease more greatly outside the communication zone than inside the communication zone. Especially, it is preferable to adjust them so that the magnetic field intensities of the magnetic fields outgoing from the transmitting antenna 2 may drop in inverse proportion to the n-th power (n>3) of the distance from the transmitting antenna 2 within the distance range sufficiently shorter than the transmission wavelength (see the claim in Japanese Patent Application No. 7-120810). This permits the magnetic field intensities to be decreased outside the communication zone while maintaining the magnetic field intensities sufficiently high inside the communication zone and securing high communication quality, and enables to drastically reduce the interference or obstruction to neighboring devices or neighboring communication systems.

An adjusting method in this case is to properly adjust at least one factor out of the loop diameter of each loop coil 2a, 2b, the number of turns thereof, the direction of turn thereof, the absolute value of the electric current flowing therein, and the phase difference between the electric currents flowing in the loop coils. Although not illustrated, in order to facilitate fine adjustment, a variable inductor, a variable capacitor or a variable resistor may be connected to each of the internal loop coil 2a and the external loop coil 2b, and they can be adjusted. In the case of the loop coils being formed on the substrate, an adjustment pattern of a metal foil or the like may be placed around the loop coils on the substrate and the location and the area of the pattern can be adjusted.

A variety of embodiments can be contemplated for the reader/writer antenna of the present invention as long as they meet the requirements of the invention that the transmitting antenna and receiving antenna are provided separately from each other, the magnetic fields of opposite polarities are induced in the receiving antenna by magnetic coupling between the receiving antenna and the transmitting antenna, and the receiving antenna is positioned so as to cancel the magnetic fields of opposite polarities with each other. There are no specific restrictions on the configuration of each loop coil forming the transmitting antenna or the receiving antenna, the number of turns thereof, the number of loop coils, the location thereof, and so on.

Figure 2:
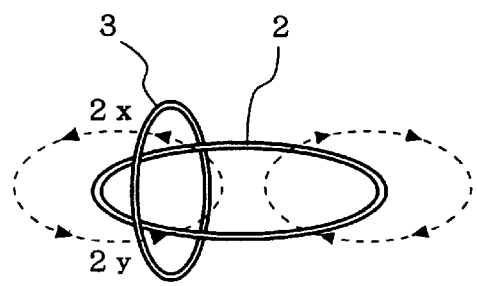
FIG. 2 is a structural drawing to show another embodiment of the antenna for reader/writer according to the present invention.

For example, the reader/writer antenna 1a of FIG. 1 had the transmitting antenna 2 consisting of the two loop coils 2a, 2b for generating the magnetic fields of mutually opposite polarities when sending the transmission signal, whereas the transmitting antenna 2 may consist of a single loop coil as in the reader/writer antenna 1b shown in FIG. 2. In this case, the receiving antenna 3 is to be located so that its loop face is perpendicular to the loop face of the transmitting antenna 2. In the magnetic flux entering the receiving antenna 3 out of the magnetic flux (represented by the dashed lines in the drawing) generated when the transmitting antenna 2 sends the transmission signal, the magnetic flux $2x$ on one side of the loop face of the transmitting antenna 2 is controlled to be equal to the magnetic flux $2y$ on the other side. This results in canceling the magnetic flux $2x$ and the magnetic flux $2y$ generated by the transmitting antenna 2 with each other in the receiving antenna 3. Accordingly, the transmission signal can be prevented from giving rise to the undesired voltage at the terminals of the receiving antenna 3.

Figure 3:
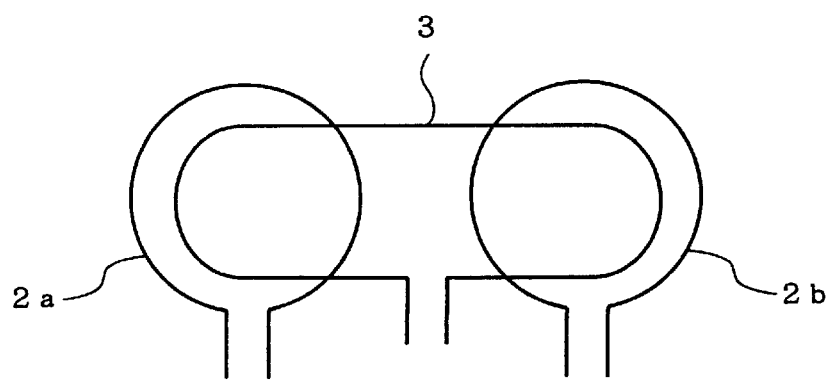
FIG. 3 is a structural drawing to show another embodiment of the antenna for reader/writer according to the present invention.

The reader/writer antenna 1a of FIG. 1 had the transmitting antenna 2 consisting of the internal loop coil 2a and the external loop coil 2b, coaxially formed in the same plane, whereas another embodiment may be the reader/writer antenna 1c shown in FIG. 3, where the transmitting antenna 2 is comprised of two, separate, circular loop coils 2a, 2b juxtaposed without overlap of loop and an overlap receiving antenna 3 is positioned so as to overlap with the both loop coils 2a, 2b. In this case, for the two loop coils 2a, 2b to generate the magnetic fields of mutually opposite polarities when sending the transmission signal, for example, the antenna terminals are to be connected so that electric currents may flow in opposite directions in the loop coils 2a, 2b.

Figure 4A:
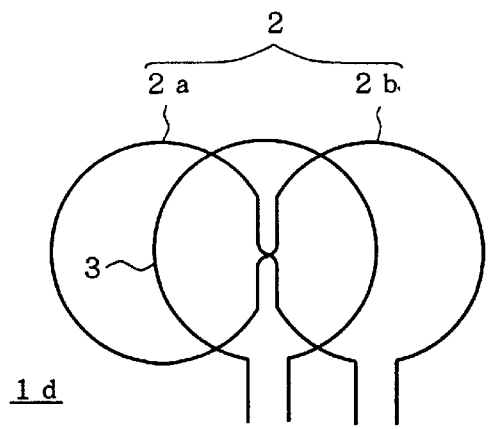
FIGS. 4A and 4B are structural drawings to show another embodiment of the antenna for reader/writer according to the present invention (wherein FIG. 4A is a plan view thereof and FIG. 4B is a side view thereof)
Figure 4B:
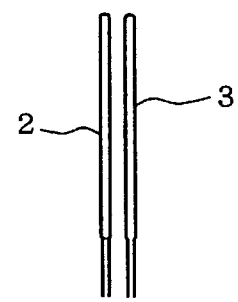

The reader/writer antenna 1d of FIG. 4 (wherein FIG. 4A is a plan view and FIG. 4B is a side view) is an example in which the transmitting antenna 2 is one obtained by shaping a line of antenna conductor so that the loop coils 2a, 2b for generating the magnetic fields of mutually opposite polarities are adjacent to each other and so that the loop coils 2a, 2b are wound in opposite direction and in which the receiving antenna 3 comprised of a loop coil is positioned substantially in the middle between the two loop coils 2a, 2b of the transmitting antenna so that the loop face of the receiving antenna 3 is parallel to the loop face of the loop coils 2a, 2b of the transmitting antenna.

Figure 5:
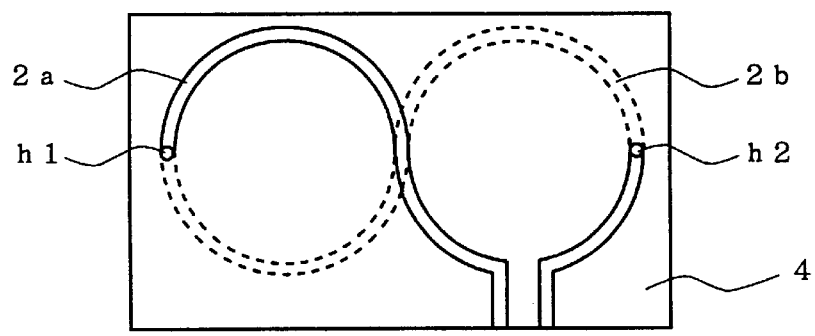
FIG. 5 is an explanatory drawing to show the transmitting antenna used in the antenna for reader/writer of the present invention.

This transmitting antenna 2 shown in FIG. 4 can be formed, for example, by routing a conductor wire in the shape of "8". In another method, as shown in FIG. 5, an S-shaped conductor pattern as represented by the solid lines in the drawing is formed by etching on one surface of a both-sided substrate 4 having the conductor layers on the both surfaces with an insulator layer inbetween, an S-shaped conductor pattern as represented by the dashed lines in the drawing is formed by etching on the other surface, and the two patterns are connected by through holes h1, h2.

In the case where the transmitting antenna 2 is constructed of the two loop coils for generating the magnetic fields of mutually opposite polarities, one can properly determine, depending upon the circumstances whether these loop coils are to be formed by winding a conductor wire, as shown in FIG. 4 or FIG. 1 described previously, or as separate and independent loop coils, as shown in FIG. 3. However, the former is preferable from the point that the directions and the phases of the electric currents flowing in the respective loop coils do not have to be set separately in order to generate the magnetic fields of mutually opposite polarities and designing of the transmitting antenna is thus easy.

Figure 6:
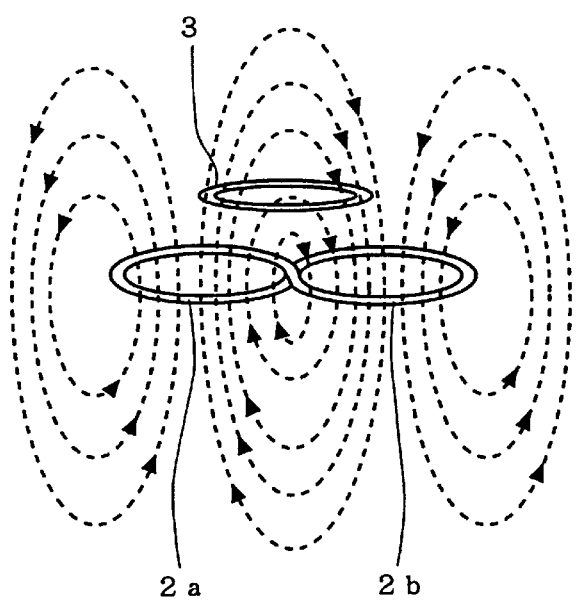
FIG. 6 is an explanatory drawing to show magnetic lines of force generated by the transmitting antenna used in the antenna for reader/writer of the present invention, and the action exerted thereby on the receiving antenna.

FIG. 6 is an explanatory drawing of magnetic lines of force generated by the transmitting antenna 2 of FIG. 4. As shown in the drawing, the magnetic field occurring from the loop coil 2a of the transmitting antenna 2 is opposite in polarity to the magnetic field occurring from the loop coil 2b. In this transmitting antenna 2 it is also preferable to properly adjust at least one factor out of the loop diameter of each loop coil 2a, 2b, the number of turn thereof, the absolute value of the electric current flowing therein, and the phase difference between the electric currents flowing in the respective loop coils so that the intensity of the total magnetic field as a composition of the magnetic fields generated from these, loop coils 2a, 2b may decrease more greatly outside the communication zone than inside the communication zone, similarly as in the foregoing transmitting antenna of FIG. 1.

Also, the magnetic flux density is high near the contact point between the two loop coils 2a, 2b of the transmitting antenna 2, as shown in FIG. 6. When the loop coil of the receiving antenna 3 is positioned in parallel with the loop face of the loop coils 2a, 2b in the region of high magnetic flux density, as shown in FIG. 4, the loop coil 2a and loop coil 2b of the transmitting antenna induce respective strong voltages with mutually opposite polarities in the loop coil of the receiving antenna 3. If the coil parameters of the loop coil of the receiving antenna 3 are set so that the mutual inductance between the loop coil of the receiving antenna 3 and the loop coil 2a of the transmitting antenna may be equal in value but opposite in polarity to the mutual inductance between the loop coil of the receiving antenna 3 and the loop coil 2b of the transmitting antenna, in the same manner as in the case of FIG. 1, they cancel out each other in the receiving antenna 3. Accordingly, this embodiment can also drastically reduce the undesired voltage occurring due to the transmission signal at the terminals of the receiving antenna 3.

Since the magnetic flux density is high near the contact point between the two adjacent loop coils 2a, 2b of the transmitting antenna of FIG. 4, as described above, use of such a transmitting antenna can largely expand the angular range of the transponder antenna to the transmitting antenna of the interrogator, necessary for the transponder to receive the transmission signal from the interrogator at predetermined reception sensitivity.

Figure 7A:
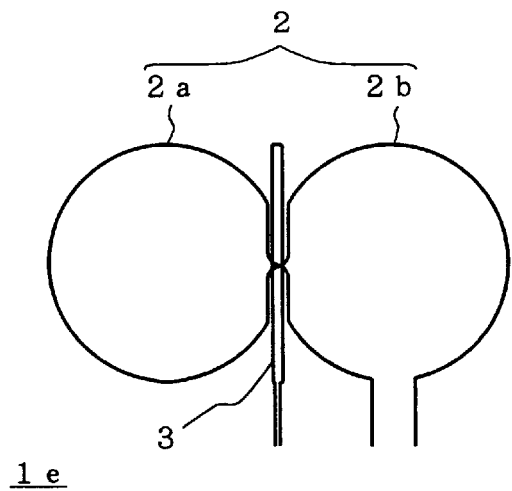
FIGS. 7A and 7B are structural drawings to show another embodiment of the antenna for reader/writer according to the present invention (wherein FIG. 7A is a plan view thereof and FIG. 7B is a side view thereof)
Figure 7B:
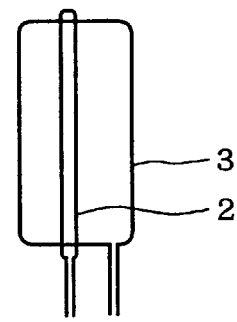
Figure 8:
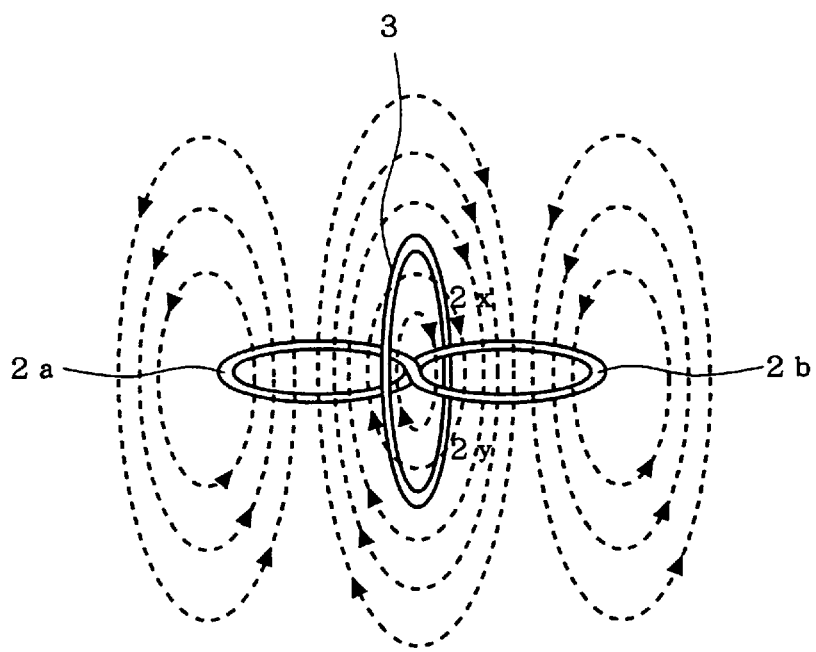
FIG. 8 is an explanatory drawing to show magnetic lines of force generated by the transmitting antenna used in the antenna for reader/writer of the present invention, and the action exerted thereby on the receiving antenna.

The reader/writer antenna 1e of FIG. 7 (FIG. 7A is a plan view and FIG. 7B is a side view) is an example in which the transmitting antenna 2 is the same as the transmitting antenna of the reader/writer antenna 1d of FIG. 4 while the receiving antenna 3 is positioned so that the loop face thereof is perpendicular to that of the loop coils 2a, 2b of the transmitting antenna. FIG. 8 is an explanatory drawing of magnetic lines of force in this case. In the case of this receiving antenna 3, when the transmitting antenna 2 generates the magnetic flux (represented by the dashed lines in the drawing) upon sending of the transmission signal, among the magnetic flux entering the receiving antenna 3 the magnetic flux 2x on one side of the loop face of the transmitting antenna 2 is controlled to be equal to the magnetic flux 2y on the other side, whereby the magnetic flux 2x and the magnetic flux 2y generated by the transmitting antenna 2 can cancel each other in the receiving antenna 3, as being the case with the foregoing reader/writer antenna 1b of FIG. 2. Therefore, this embodiment can also drastically reduce the undesired voltage occurring due to the transmission signal at the terminals of the receiving antenna 3.

Figure 9:
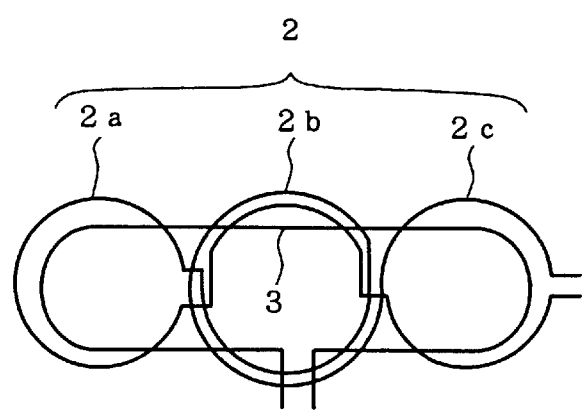
FIG. 9 is a structural drawing to show another embodiment of the antenna for reader/writer according to the present invention.

The reader/writer antenna 1f of FIG. 9 is an example in which the transmitting antenna 2 is composed of three loop coils 2a, 2b, 2c adjacent to each other in a row, obtained by routing a wire of antenna conductor in the configuration of adjacent loop coils wound in mutually opposite directions, thereby forming the adjacent loop coils for generating the magnetic fields of mutually opposite polarities, similarly as the reader/writer antenna 1d of FIG. 4 was. In this case, the polarities of the two loop coils at the both ends are the same while the polarity of the loop coil 2b at the center is opposite to those of these loop coils 2a, 2c. Therefore, the coil parameters of the loop coil of the receiving antenna 3 are set so that the mutual inductance between the loop coil of the receiving antenna 3 and the loop coils 2a, 2c at the both ends of the transmitting antenna may be equal in value but opposite in polarity to the mutual inductance between the loop coil of the receiving antenna 3 and the loop coil 2b at the center of the transmitting antenna. This can suppress the undesired voltage occurring due to the transmission signal in the receiving antenna 3.

Figure 10:
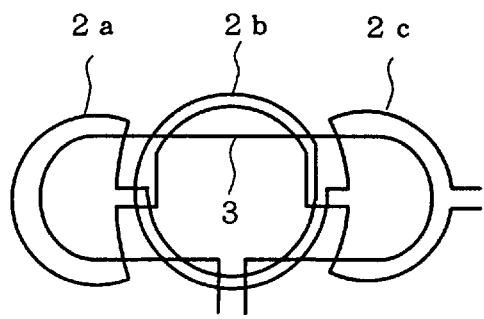
FIG. 10 is a structural drawing to show another embodiment of the antenna for reader/writer according to the present invention.

The reader/writer antenna 1g of FIG. 10 is a modification of the reader/writer antenna 1f of FIG. 9, obtained by modifying the two end loop coils 2a, 2c of the transmitting antenna 2 into a non-circular shape. As exemplified by this embodiment, a variety of configurations can be adopted for the loop coils of the transmitting antenna and receiving antenna used in the present invention, without having to be limited to the circle.

Figure 11:
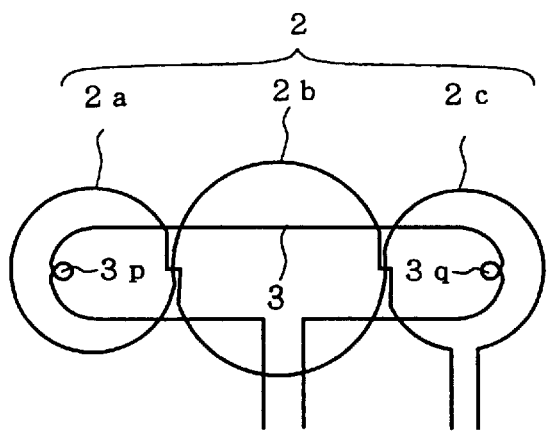
FIG. 11 is a structural drawing to show another embodiment of the antenna for reader/writer according to the present invention.

The reader/writer antenna 1h of FIG. 11 is similar to the reader/writer antenna if of FIG. 9 in that the transmitting antenna 2 is composed of three adjacent loop coils 2a, 2b, 2c and the adjacent loop coils are wound in mutually opposite directions, but the reader/writer antenna 1h of FIG. 11 is different from the transmitting antenna 2 of FIG. 9 in that the loop diameter of the both end loop coils 2a, 2c is smaller than that in FIG. 9 and the number of turn of the center loop coil 2b is decreased.

Further, the receiving antenna 3 of the reader/writer antenna 1*h* of FIG. 11 is provided with auxiliary coils 3*p*, 3*q*. A cancellation of the mutual inductances between the receiving antenna 3 and the transmitting antenna 2 can be accurately adjusted by changing the shape of the auxiliary coils 3*p*, 3*q* in the case of the loop coil of the receiving antenna 3 being a wound wire coil or by cutting the patterns of the auxiliary coils 3*p*, 3*q* in the case of the loop coil being one patterned by etching of conductor layer on the substrate. It is thus preferred to provide the receiving antenna 3 with the auxiliary coils 3*p*, 3*q* for adjusting the mutual inductances.

Figure 12:
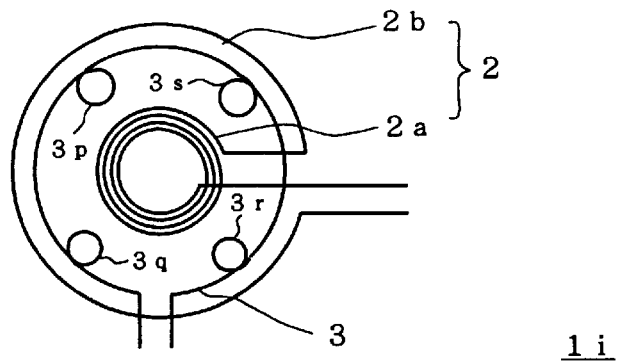
FIG. 12 is a structural drawing to show another embodiment of the antenna for reader/writer according to the present invention.

The reader/writer antenna 1*i* of FIG. 12 is similar to the reader/writer antenna 1*a* of FIG. 1 in that the transmitting antenna 2 is composed of the internal loop coil 2*a* and the external loop coil 2*b*, formed coaxially on the same plane, and in that the loop coil of the receiving antenna 3 is positioned nearly coaxially with the internal loop coil 2*a* and external loop coil 2*b*, but it is also similar to the reader/writer antenna 1*h* of FIG. 11 in that the receiving antenna 3 is provided with auxiliary coils 3*p*, 3*q*, 3*r*, 3*s* for accurately adjusting the cancellation of mutual inductances between the receiving antenna 3 and the transmitting antenna 2.

In addition to the method for adding the auxiliary coils as shown in FIG. 11 or FIG. 12, the mutual inductances between the receiving antenna 3 and the transmitting antenna 2 can be adjusted by a method of connecting a variable capacitor or a variable resistor to each loop coil of the transmitting antenna or the loop coil of the receiving antenna and adjusting it or by a method of placing a metal foil or the like around the loop coils and adjusting the location and the area of the metal foil.

As described above, the reader/writer antenna of the present invention is basically comprised of the transmitting antenna and the receiving antenna and, preferably, the transmitting antenna is composed of at least two loop coils for generating the magnetic fields of mutually opposite polarities when sending the transmission signal. The receiving antenna is arranged so as to cancel out the magnetic fields coming out of the transmitting antenna, whereby the receiving antenna is prevented from detecting the transmission signal.

Figure 13:
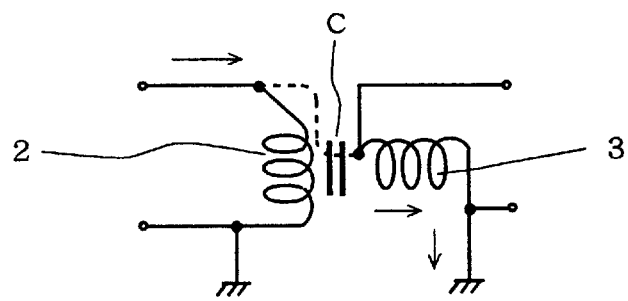
FIG. 13 is an explanatory drawing of a leakage current due to capacitive coupling between the transmitting antenna and the receiving antenna.

Further, the present invention permits the above basic construction to be modified with a variety of means for shielding the receiving antenna from the transmission signal emitted from the transmitting antenna. Even if the magnetic fields from the transmitting antenna are canceled out in the receiving antenna, there exists a stray coupling capacitance due to capacitive coupling between the receiving antenna and the transmitting antenna, which causes a leakage current to flow in the receiving antenna. FIG. 13 is an explanatory drawing to show a general example of the leakage current, showing that when an electric current flows along the arrow in the coil of the transmitting antenna 2, an electric current also flows along the arrows in the receiving antenna 3 through the stray coupling capacitance C.

The present invention permits provision of a means for greatly reducing influence of the stray coupling capacitance C so as to overcome the problem of leakage current. For example, the means for greatly reducing the stray coupling capacitance C may be a bifilar choke provided in the receiving antenna or an electrostatic shield over the receiving antenna.

Figure 14:
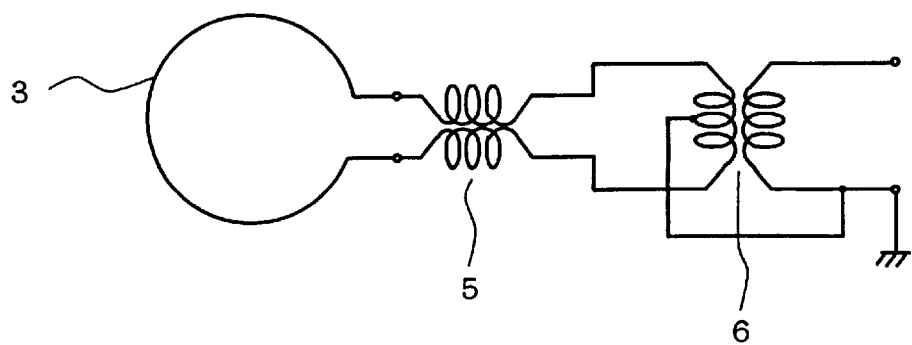
FIG. 14 is an explanatory drawing of a bifilar choke for preventing the leakage current.

Among them, an embodiment provided with a bifilar choke is arranged, for example as shown in FIG. 14, in such a manner that a bifilar choke 5 is provided after the loop coil of the receiving antenna 3 and a matching transformer 6 is provided between the bifilar choke 5 and the main body of receiving circuitry. In this case, it is preferable that the two coils composing the bifilar choke have a large impedance against currents flowing in the same direction. This is preferably realized by increasing the number of turns of the coils or by inserting a core of ferrite or the like into each coil. This can greatly reduce the leakage current, thus substantially suppressing a voltage drop due to the leakage current at the terminals of the receiving antenna. In contrast with it, electric currents due to the reply signal from the transponder flow in opposite directions in the bifilar choke so as to cause no voltage drop, and thus they are not attenuated. Accordingly, the original object signal can be detected well.

Figure 15:
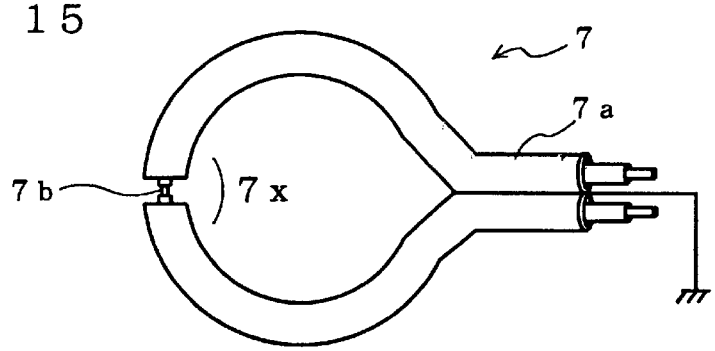
FIG. 15 is an explanatory drawing to show an example to shield the receiving antenna by using a shielded cable in order to prevent the leakage current.

On the other hand, an embodiment for electrostatically shieling the receiving antenna is arranged, for example as shown in FIG. 15, in such a manner that a shielded cable (or coaxial cable) 7 is used for the receiving antenna 3 and a shield sheath 7*a* thereof is grounded. In this case, an internal conductor 7*b* of the shielded cable 7 is used as an antenna. A part of the shield sheath 7*a* is cut off at a part 7*x* of the shielded cable 7 so as to prevent a loop from being formed in the shield sheath 7*a*.

Figure 16A:
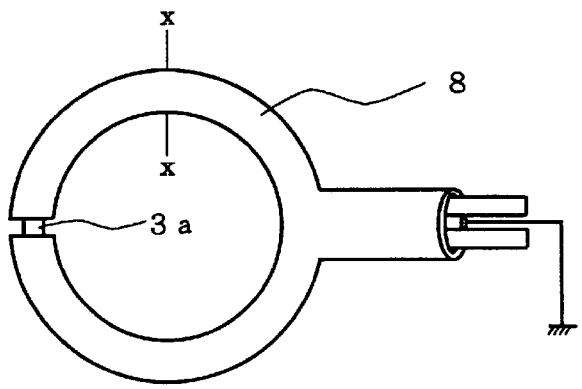
FIGS. 16A and 16B are explanatory drawings to show an example to shield the receiving antenna by a pipe material in order to prevent the leakage current.
Figure 16B:
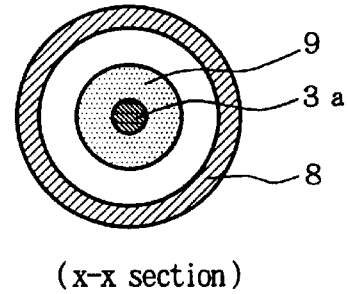

Another embodiment may be arranged to shield the receiving antenna 3 by covering it by an electrically conductive pipe material 8, as shown in FIG. 16A, and grounding this pipe material 8. This pipe material 8 is a C-shaped pipe covering the antenna conductor 3*a* coated with an insulating material 9, as shown in the sectional view of FIG. 16B, and one end thereof is connected to the earth.

Figure 17A:
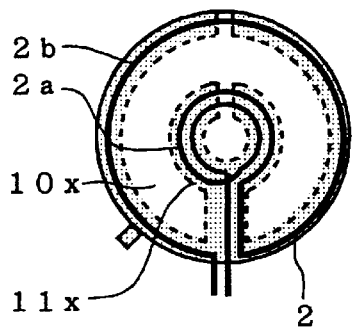
FIGS. 17A, 17B, and 17C are explanatory drawings to show an example to shield the receiving antenna by earth plates in order to prevent the leakage current.
Figure 17B:
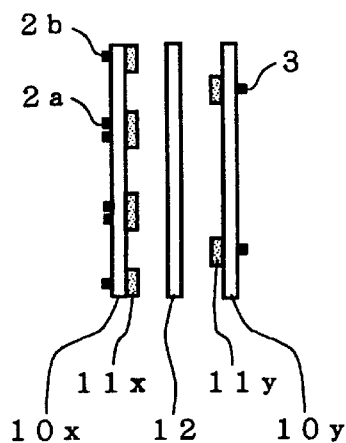
Figure 17C:
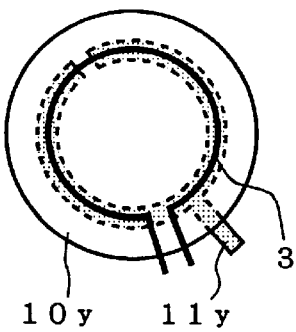

FIG. 17A (a top view), FIG. 17B (a side view), and FIG. 17C (a bottom view) show another example as a modification of the reader/writer antenna shown in FIG. 1, wherein disk transmitting antenna plate 10*x* and receiving antenna plate 10*y* are placed on the corresponding loop faces of the transmitting antenna 2 and receiving antenna 3 opposed to each other, an earth plate 11*x* (the dotted portion in FIG. 17A) is disposed on the surface of the transmitting antenna plate 10*x* opposite to the loop coils 2*a*, 2*b*, an earth plate 11*y* (the dotted portion in FIG. 17C) is also disposed on the surface of the receiving antenna plate 10*y* opposite to the loop coil, an insulating plate 12 is further disposed between these earth plate 11*x* and earth plate 11*y*, and the earth plate 11*x* and earth plate 11*y* are connected to the earth.

Figure 18A:
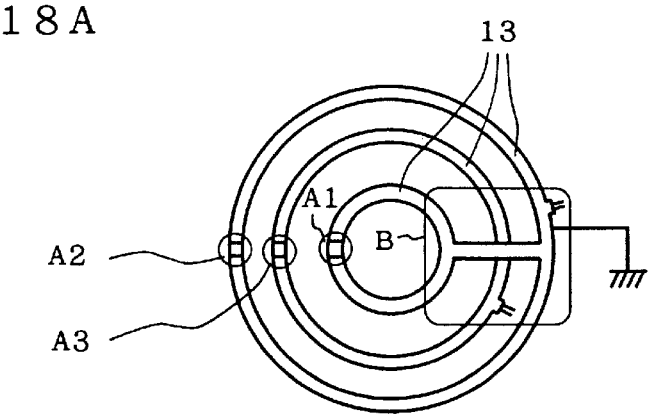
FIGS. 18A, 18B, and 18C are explanatory drawings to show an example to shield the receiving antenna and transmitting antenna by shield tubes in order to prevent the leakage current.
Figure 18B:
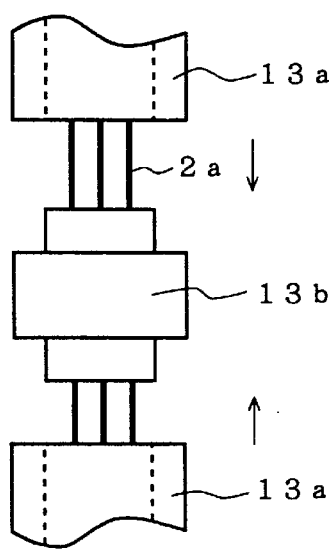
Figure 18C:
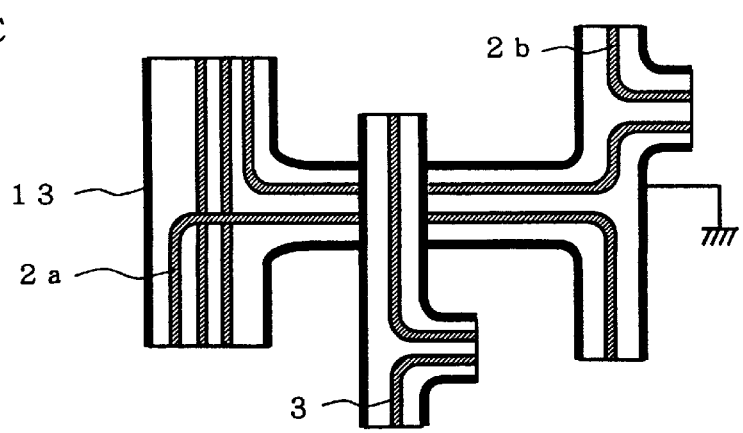

FIG. 18A is an example in which, in order to more shield the receiving antenna in the reader/writer antenna shown in FIG. 1, copper shield pipes 13 house and shield the transmitting antenna (the internal loop coil of three turns and the external loop coil of a turn) and the receiving antenna (the loop coil of a turn) of respective conductor wires insulated. FIG. 18B is an enlarged illustration of part Al of the internal loop coil 2*a* of the transmitting antenna shielded by the shield pipe 13 as shown in FIG. 18A, and FIG. 18C is an enlarged cross section of Part B of the internal loop coil 2*a*. As shown, the shield pipe 13 is constructed of electrically conductive pipes 13*a* brought into fit to an insulating member 13*b* on the both sides thereof as represented by the arrows, at part Al, thereby avoiding closing of the conductive loop of the conductive pipe 13*a*. The same arrangement is also applied to part A2 of the external loop coil of the transmitting antenna and part A3 of the receiving antenna, corresponding to part Al of the internal loop coil.

EXAMPLES

Example 1 and Comparative Example 1

Fabricated was the reader/writer antenna 1*a* of the present invention according to the embodiment shown in FIG. 1. In this case, the coil parameters of the internal loop coil 2a and external loop coil 2b constituting the transmitting antenna 2 were set as shown in Table 1 (Example 1).

For comparison's sake, another reader/writer antenna was fabricated in the same manner as in Example 1 except that the transmitting antenna was constructed of a single loop coil. In this case, the coil parameters of the loop coil of the transmitting antenna were set as shown in Table 1, and the electric current was determined so that the magnetic field intensity became 100 dBμA/m at the position of object distance 15 cm.

TABLE 1

|  | Radius (mm) | Turns | Current (A) |
| --- | --- | --- | --- |
| Ex.1 |  |  |  |
| Internal loop coil 2a: | 50 | 3 | 1.5 |
| External loop coil 2b: | 61.2 | 2 | 1.5 |
| Comp. Ex. 1 Single loop coil: | 50.0 | 3 | 0.102 |

Measurement was carried out using a search coil to obtain distributions of magnetic field intensities by these transmitting antennas, i.e., to obtain relations between the distance from transmitting antenna and the magnetic field intensity. Results of the measurement are shown in FIG. 19.

Figure 19:
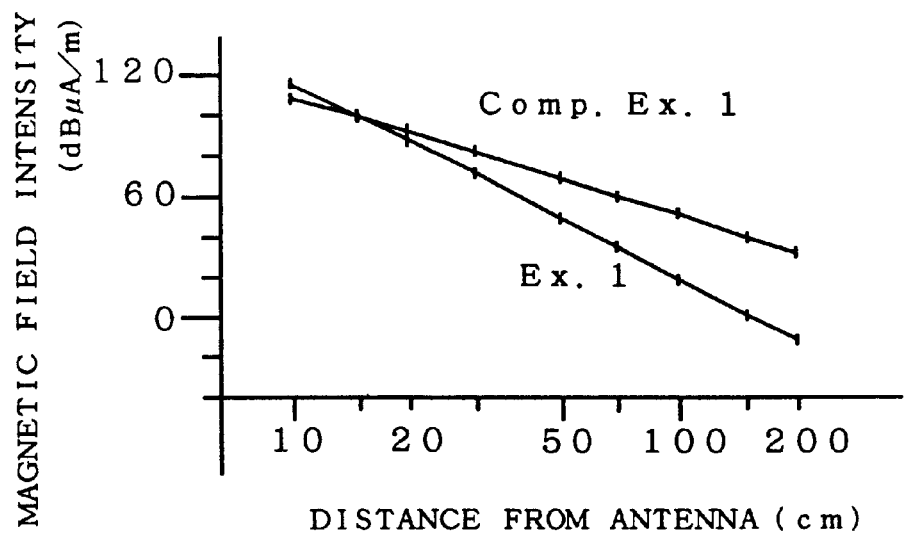
FIG. 19 is a drawing to show the relationship between the distance from the antenna and the magnetic field intensity for transmitting antennas of reader/writer antennas in Example and Comparative Example.

From FIG. 19, with the transmitting antenna of Comparative Example the magnetic field intensity gently drops in inverse proportion to the third power of the distance from the antenna, whereas with the transmitting antenna of Example 1 the magnetic field intensity steeply drops with an increase of the distance from antenna in inverse proportion to the fifth power of the distance from antenna. Therefore, the magnetic field intensity can be maintained high in the communication zone and the magnetic field intensity drops to the sufficiently low level outside the communication zone, thus greatly reducing the interference or obstruction to the neighboring devices or neighboring communication systems.

Next, the mutual inductance was measured for various loop diameters in the case of the loop coil of the receiving antenna being of a single turn. Obtained were the mutual inductance M (3–2a) between the loop coil of the receiving antenna and the internal loop coil of the transmitting antenna, the mutual inductance M (3–2b) between the loop coil of the receiving antenna and the external loop coil of the transmitting antenna, and the mutual inductance M (3–2a, 3–2b) between the loop coil of the receiving antenna and the coil of the transmitting antenna, which was a transmitting antenna composed of the internal and external loop coils connected in series so as to be of opposite polarities and regarded as a single transmitting coil. Results of this measurement are shown in FIG. 20.

Figure 20:
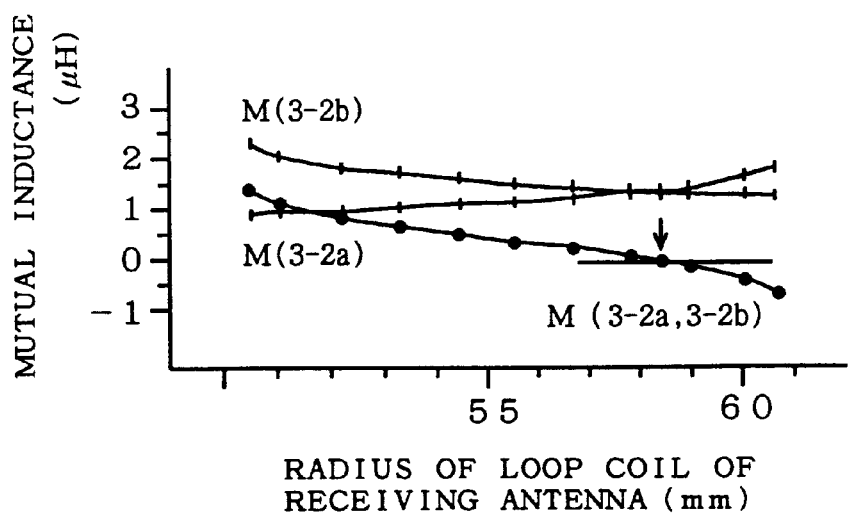
FIG. 20 is a drawing to show the relationship between the loop radius of loop coil of the receiving antenna and the mutual inductance between the receiving antenna and the internal or external loop coil of the transmitting antenna, for the antenna for reader/writer in Example.

It is seen from FIG. 20 that in the case where the internal loop coil 2a of the transmitting antenna has the radius 50 mm and three turns, the external loop coil 2b has the radius 61.2 mm and two turns, and they are coaxially positioned on a same plane, M=0 when the loop coil of the receiving antenna has the radius 58.4 mm and a turn, resulting in no coupling existing between the receiving antenna and the transmitting antenna (at the point shown by the arrow in the drawing). Therefore, the coil parameters of the receiving antenna can be determined as those at the point where coupling disappears between the receiving antenna and the transmitting antenna.

As detailed above, the present invention can prevent the transmission signal sent out from the interrogator to the transponder from appearing at the antenna terminals of the interrogator in receiving the reply signal from the transponder through the antenna of interrogator in the non-contact data carrier system for performing the short-distance communication by electromagnetic induction between the interrogator and the transponder, thereby facilitating detection of the reply signal from the transponder and enhancing the reading reliability.

Further, the present invention may employ the transmitting antenna comprised of at least two loop coils for generating the magnetic fields of mutually opposite polarities wherein at least one factor is selected and properly set out of the loop diameter of each loop coil, the number of turn thereof, the direction of turn thereof, the absolute value of the electric current flowing therein, and the phase difference between the electric currents flowing in the respective loop coils, whereby the magnetic field intensity is high enough within the expected communication zone, the magnetic field intensity steeply decreases with an increase of the distance from antenna, and the magnetic field intensity can be surely maintained below the predetermined level outside the communication zone.

Accordingly, the intensity of the magnetic field sent from the interrogator to the transponder can be decreased sufficiently outside the communication zone so as to greatly reduce the interference or obstruction to the neighboring devices or neighboring communication systems while being maintained high enough to secure the high communication quality within the communication zone, and at the same time as it, when the interrogator detects the reply,signal from the transponder, the interrogator can be prevented from undesirably detecting the transmission signal sent from the interrogator to the transponder, thereby facilitating detection of the reply signal from the transponder and enhancing the reading reliability.

What is the claim is:

1. An antenna for a reader/writer of an interrogator in a non-contact data carrier system comprising the interrogator and transponder, said antenna for the reader/writer of the interrogator comprising a transmitting antenna for transmitting a signal to the transponder and a receiving antenna for receiving a signal from the transponder, wherein said receiving antenna comprises a loop coil located at a position where magnetic fields of opposite polarities to each other are induced in the receiving antenna by magnetic coupling between the receiving antenna and the transmitting antenna and where said magnetic fields of the opposite polarities cancel out each other, wherein said transmitting antenna comprises at least two loop coils for generating magnetic fields of opposite polarities to each other and the receiving antenna is located so that magnetic fields induced in the receiving antenna by the magnetic fields of the opposite polarities to each other generated from said loop coils cancel out each other and wherein said transmitting antenna is made of a line of antenna conductor so as to form the loop coils of the transmitting antenna, adjacent to each other, for generating the magnetic fields of the opposite polarities to each other and so as to wind the adjacent loop coils in mutually opposite directions and wherein said receiving antenna comprises an auxiliary coil for adjusting a mutual inductance between said receiving antenna and said transmitting antenna.

2. The antenna for reader/writer according to claim 1, wherein at least one parameter is adjusted out of a loop diameter of each loop coil of the transmitting antenna, a number of turns thereof, a direction of turn thereof, an absolute value of an electric current flowing therein, and a phase difference between electric currents flowing in the respective loop coils so that magnetic field intensities of the magnetic fields coming out from the transmitting antenna decrease more greatly outside a communication zone than inside the communication zone.

3. The antenna for reader/writer according to claim 1, wherein said receiving antenna comprises a bifilar choke for preventing a leakage current from flowing caused by a capacitive coupling between said receiving antenna and said transmitting antenna.

4. The antenna for reader/writer according to claim 1, wherein said receiving antenna comprises an electrostatic shield for preventing capacitive coupling between said receiving antenna and said transmitting antenna.

* * * * *